(12) United States Patent
Jacobs et al.

(10) Patent No.: US 11,591,444 B2
(45) Date of Patent: Feb. 28, 2023

(54) POLYPROPYLENE FILM STRUCTURE HAVING INCREASED LIFE TIME

(71) Applicant: Borealis AG, Vienna (AT)

(72) Inventors: Franciscus Jacobs, Evergem (BE); Guido Boelaers, Overpelt (BE); Dietrich Gloger, Linz (AT); Helmut Rinnerthaler, Linz (AT)

(73) Assignee: Borealis AG, Vienna (AT)

( * ) Notice: Subject to any disclaimer, the term of this patent is extended or adjusted under 35 U.S.C. 154(b) by 996 days.

(21) Appl. No.: 16/340,219

(22) PCT Filed: Oct. 24, 2017

(86) PCT No.: PCT/EP2017/077094
§ 371 (c)(1),
(2) Date: Apr. 8, 2019

(87) PCT Pub. No.: WO2018/077838
PCT Pub. Date: May 3, 2018

(65) Prior Publication Data
US 2020/0040150 A1    Feb. 6, 2020

(30) Foreign Application Priority Data
Oct. 27, 2016 (EP) .................................. 16196111

(51) Int. Cl.
*C08J 5/18* (2006.01)
*B32B 15/085* (2006.01)
(Continued)

(52) U.S. Cl.
CPC ............... *C08J 5/18* (2013.01); *B32B 15/085* (2013.01); *B32B 15/20* (2013.01); *B32B 37/203* (2013.01);
(Continued)

(58) Field of Classification Search
CPC ....... C08J 5/18; C08J 2323/12; B32B 15/085; B32B 2307/518; B32B 2457/16;
(Continued)

(56) References Cited

U.S. PATENT DOCUMENTS 4,534,953 A    8/1985 Goko et al.
6,077,907 A    6/2000 Raetzsch et al.
(Continued)

FOREIGN PATENT DOCUMENTS

CN    101848961 A    9/2010
CN    102356439 A    2/2012
(Continued)

OTHER PUBLICATIONS

Zhou, et al., "A new decoupling method for accurate quantification of polyethylene copolymer composition and triad sequence distribution with 13C NMR," J. Magnetic Resonance, vol. 187, 2007, pp. 225-233.

(Continued)

*Primary Examiner* — Arun Ramaswamy
(74) *Attorney, Agent, or Firm* — Lowenstein Sandler LLP

(57) ABSTRACT

The present invention refers to a structure comprising a biaxially oriented polypropylene (BOPP) film having at least one layer comprising a homopolymer of propylene which layer is in contact with an oil phase, the homopolymer of propylene has a) a content of isotactic pentads in the range from 95% to 98%, and b) a content of ash of not more than 30 ppm, based on the total weight of the homopolymer of propylene, characterized in that the oil phase has an absorbance value of ≤0.1, relative to the pure oil, as determined spectrophotometrically at a wavelength of 860 nm by the reduction of transmitted light intensity. The present invention further refers to the use of a biaxially oriented polypropylene (BOPP) film for making capacitors comprising (Continued)

Blank    CE1    CE2    CE3    IE1    IE2 said structure, wherein the oil phase has an absorbance value of ≤0.1, relative to the pure oil, as determined spectrophotometrically at a wavelength of 860 nm by the reduction of transmitted light intensity as well as the use of the homopolymer of propylene for increasing the life time of a capacitor.

14 Claims, 1 Drawing Sheet

(51) Int. Cl.

| | |
|---|---|
| *B32B 15/20* | (2006.01) |
| *H01G 4/04* | (2006.01) |
| *H01G 4/18* | (2006.01) |
| *H01G 4/32* | (2006.01) |
| *H01B 3/22* | (2006.01) |
| *H01B 3/44* | (2006.01) |
| *B32B 37/20* | (2006.01) |

(52) U.S. Cl.
CPC ............... *H01G 4/04* (2013.01); *H01G 4/18* (2013.01); *H01G 4/32* (2013.01); *B32B 2307/518* (2013.01); *B32B 2457/16* (2013.01); *C08J 2323/12* (2013.01); *H01B 3/22* (2013.01); *H01B 3/441* (2013.01)

(58) Field of Classification Search
CPC ......... B32B 15/20; B32B 37/203; H01B 3/22; H01B 3/441; H01B 3/02; H01G 4/04; H01G 4/18; H01G 4/32
USPC .......................... 361/502, 503, 530; 29/25.41
See application file for complete search history.

(56) References Cited

U.S. PATENT DOCUMENTS

| | | | |
|---|---|---|---|
| 6,094,337 | A | 7/2000 | Ueda et al. |
| 6,316,542 | B1 | 11/2001 | Berger |
| 2004/0175527 | A1* | 9/2004 | Shiota .................. C09J 7/29 428/343 |

FOREIGN PATENT DOCUMENTS

| | | | |
|---|---|---|---|
| EP | 99026 | A2 | 1/1984 |
| EP | 792894 | A2 | 9/1997 |
| EP | 885918 | A1 | 12/1998 |
| EP | 2543684 | A1 | 1/2013 |
| EP | 2733157 | A1 * | 5/2014 ........... B29C 55/005 |
| JP | H09148176 | A | 6/1997 |
| JP | H10223472 | A | 8/1998 |
| JP | H11162779 | A | 6/1999 |
| JP | H11286071 | A | 10/1999 |
| JP | 2002154187 | A | 5/2002 |
| JP | 2008127460 | A | 6/2008 |
| JP | H80337715 | A | 6/2008 |
| WO | 2016038092 | A1 | 3/2016 |
| WO | 2016174034 | A1 | 11/2016 |

OTHER PUBLICATIONS

Busico, et al., "Alk-1-ene Polymerization in the Presence of a Monocyclopentadienyl Zirconium (IV) Acetamidinate Catalyst: Microstructural and Mechanistic Insights," Macromolecular Rapid Commun., vol. 28, 2007, pp. 1128-1134.
Busico, et al., "Full Assignment of the 13C NMR Spectra of Regioregular Polypropylenes: Methyl and Methylene Region," Macromolecules, 1997, vol. 30, pp. 6251-6263.
Resconi, et al., "Selectivity in Propene Polymerization with Metallocene Catalysts," Chem. Rev., 2000, vol. 100, pp. 1253-1345.
Cheng, "13C NMR Analysis of Ethylene-Propylene Rubbers," Macromolecules, 1984, vol. 17, 1984, pp. 1950-1955.
Busico, et al., "Microstructure of polypropylene," Prog. Polym. Sci., vol. 26, 2001, pp. 443-533.
Wang, et al., "Structural Analysis of Ethylene/Propylene Copolymers Synthesized with a Constrained Geometry Catalyst," Macromolecules, vol. 33, 2000, 1157-1162.
International Search Report and the Written Opinion of the International Searching Authority for International Application No. PCT/EP2017/077094, dated Dec. 14, 2017, 15 pages.
Korean Office Action for Application No. 10-2019-7009845 dated Nov. 23, 2020 and English Translation thereof, 10 pages.
Notice of Reasons for Rejection for Japanese Application No. 2019-517263 and English Translation Thereof, dated Oct. 20, 2020, 4 pages.
Office Action for Indian Application No. 201917014326 dated Feb. 24, 2020, 5 pages.
English Translation of Japanese Office Action for JP2019517263 dated Mar. 24, 2020, 3 pages.
English Translation of Chinese Office Action for Application No. 201880062370.X dated Jan. 14, 2021, 10 pages.

* cited by examiner

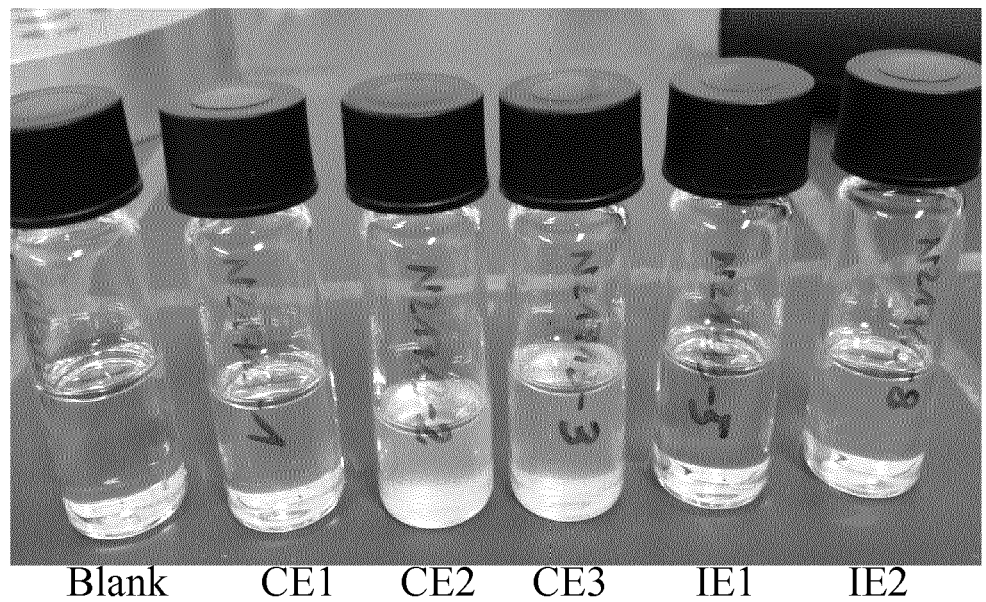

POLYPROPYLENE FILM STRUCTURE HAVING INCREASED LIFE TIME

CROSS-REFERENCE TO RELATED APPLICATION(S)

This application is a national phase entry under 35 U.S.C. § 371 of International Application No. PCT/EP2017/077094, filed on Oct. 24, 2017, which claims the benefit of priority of European Patent Application No. 16196111.5, filed on Oct. 27, 2016. The contents of these applications are hereby incorporated by reference herein in their entirety.

FIELD OF THE INVENTION

The present invention refers to a structure comprising a biaxially oriented polypropylene (BOPP) film having at least one layer comprising a homopolymer of propylene which layer is in contact with an oil phase, the homopolymer of propylene has a) a content of isotactic pentads in the range from 95% to 98%, and b) a content of ash of not more than 30 ppm, based on the total weight of the homopolymer of propylene, characterized in that the oil phase has an absorbance value of ≤0.1, relative to the pure oil, as determined spectrophotometrically at a wavelength of 860 nm by the reduction of transmitted light intensity. The present invention further refers to the use of a biaxially oriented polypropylene (BOPP) film for making capacitors comprising said structure, wherein the oil phase has a absorbance value of ≤0.1, relative to the pure oil, as determined spectrophotometrically at a wavelength of 860 nm by the reduction of transmitted light intensity as well as the use of the homopolymer of propylene for increasing the life time of a capacitor

PROBLEM TO BE SOLVED

Biaxially oriented polypropylene (BOPP) films, also known as biaxially oriented films, are used in a wide variety of technical applications such as packaging, tapes or capacitor films. One method of producing capacitors is to wind a biaxially oriented PP (BOPP) film with an aluminium foil. Currently, biaxially oriented polypropylene films are mainly used as the dielectric sheet material of power capacitors operated at a voltage of 600 V or higher by virtue of their excellent electric properties. A power capacitor of this type usually has a structure as a belt-bundled assembly of several to several tens of unit capacitor elements each in the form of a flattened rolled body prepared by enrolling a dual layer consisting of a BOPP film and an aluminium foil. Such a belt-bundled assembly of unit capacitors is impregnated with oil in a metal casing before hermetic sealing.

Such assemblies are well known in the art. For example, EP-A-885918 discloses oil impregnated films of BOPP having isotactic pentad fraction of 99% or more and an ash content of 30 ppm or less.

However, capacitor films used for oil impregnation in high voltage capacitors often lack enough crystallinity which reduces the desirable stiffness and temperature stability during the film converting and the long life time in the capacitor itself. Impregnated films, typically produced on the double bubble technology, have even a lower crystallinity compared to films made by the more commonly used tenter process.

Thus, there is a problem of deposit formations inside the capacitor via the oil phase extracting low molecular weight polypropylene fractions and perhaps additives. That is to say, the oil phase unfortunately contributes to the BOPP film aging and dramatically reduces its life time.

Thus, there is still a need in the art for providing a biaxially oriented polypropylene (BOPP) film which avoids the foregoing disadvantages and especially allows for reducing the deposit formations inside the capacitor via the oil phase. In other words, it would be desirable to provide a biaxially oriented polypropylene (BOPP) film having an increased life time.

Accordingly, it is an object of the present invention to provide a biaxially oriented polypropylene (BOPP) film featuring an increased life time, while other properties such as their mechanical properties and processability are kept on a high level.

The present invention is based on the finding that a biaxially oriented polypropylene film having an increased life time can be accomplished by a homopolymer of propylene having a) a content of isotactic pentads in the range from 95% to 98%, and b) a content of ash of not more than 30 ppm, based on the total weight of the homopolymer of propylene.

SUMMARY OF THE INVENTION

Accordingly, the present invention is directed in a first aspect to a structure comprising a biaxially oriented polypropylene (BOPP) film having at least one layer comprising a homopolymer of propylene which layer is in contact with an oil phase, the homopolymer of propylene has a) a content of isotactic pentads in the range from 95% to 98%, and b) a content of ash of not more than 30 ppm, based on the total weight of the homopolymer of propylene, characterized in that the oil phase has an absorbance value of ≤0.1, relative to the pure oil, as determined spectrophotometrically at a wavelength of 860 nm by the reduction of transmitted light intensity.

According to one embodiment, the biaxially oriented polypropylene (BOPP) film comprises from 400 to 5000 ppm, based on the total weight of the homopolymer of propylene, of additives selected from the group consisting of stabilisers, acid scavengers, nucleating agents and mixtures thereof.

According to another embodiment, the stabilisers consist of 1,3,5-trimethyl-2,4,6-tris(3,5-di-tert-butyl-4-hydroxybenzyl)benzene in an amount of from 400 to 2000 ppm and optionally butylhydroxytoluene in an amount of from 100 to 1000 ppm, based on the total weight of the homopolymer of propylene.

According to yet another embodiment, the stabilisers consist of 1,3,5-trimethyl-2,4,6-tris(3,5-di-tert-butyl-4-hydroxybenzyl)benzene in an amount of from 400 to 1000 ppm and optionally butylhydroxytoluene in an amount of from 100 to 800 ppm, based on the total weight of the homopolymer of propylene.

According to one embodiment, the oil phase comprises at least 20% by weight of aromatic hydrocarbons.

According to another embodiment, the oil phase comprises cyclic aromatic hydrocarbons, preferably toluene derivatives.

According to yet another embodiment, the oil phase comprises at least 50% by weight of cyclic aromatic hydrocarbons.

According to one embodiment, the absorbance essentially consists of polypropylene fractions.

According to another embodiment, the oil phase has an absorbance value of from 0.01 to 0.1, relative to the pure oil, as determined spectrophotometrically at a wavelength of 860 nm by the reduction of transmitted light intensity According to yet another embodiment, the absorbance value, determined spectrophotometrically at a wavelength of 860 nm, of the oil phase is at least 50% below the absorbance value of the oil phase of a biaxially oriented polypropylene (BOPP) film which is free of a homopolymer of propylene having a content of isotactic pentads in the range from 95% to 98%, and a content of ash of not more than 30 ppm.

According to one embodiment, the structure is a capacitor.

According to a further aspect, the use of a biaxially oriented polypropylene (BOPP) film for making capacitors comprising the structure, as defined herein, is provided, wherein the oil phase has an absorbance value of ≤0.1, relative to the pure oil, as determined spectrophotometrically at a wavelength of 860 nm by the reduction of transmitted light intensity.

According to one embodiment, the making of capacitors comprises the steps of flat winding the film and an aluminium foil to obtain a wound structure and impregnating the wound structure with an oil phase.

According to another aspect, the use of a homopolymer of propylene having a) a content of isotactic pentads in the range from 95% to 98%, and b) a content of ash of not more than 30 ppm, based on the total weight of the homopolymer of propylene, in a structure as defined herein for increasing the life time of a capacitor is provided, characterized in that the increased life time is achieved if the oil phase has an absorbance value of ≤0.1, relative to the pure oil, as determined spectrophotometrically at a wavelength of 860 nm by the reduction of transmitted light intensity.

It should be understood that for the purposes of the present invention, the following terms have the following meaning:

Where the term "comprising" is used in the present description and claims, it does not exclude other elements. For the purposes of the present invention, the term "consisting of" is considered to be a preferred embodiment of the term "comprising of". If hereinafter a group is defined to comprise at least a certain number of embodiments, this is also to be understood to disclose a group, which preferably consists only of these embodiments.

Where an indefinite or definite article is used when referring to a singular noun, e.g. "a", "an" or "the", this includes a plural of that noun unless something else is specifically stated.

Terms like "obtainable" or "definable" and "obtained" or "defined" are used interchangeably. This e.g. means that, unless the context clearly dictates otherwise, the term "obtained" does not mean to indicate that e.g. an embodiment must be obtained by e.g. the sequence of steps following the term "obtained" even though such a limited understanding is always included by the terms "obtained" or "defined" as a preferred embodiment.

When in the following reference is made to preferred embodiments or technical details of the inventive structure, it is to be understood that these preferred embodiments and technical details also refer to the inventive use defined herein and vice versa (as far as applicable). If, for example, it is set out that the biaxially oriented polypropylene (BOPP) film comprises from 400 to 5000 ppm, based on the amount of the homopolymer of propylene, of additives selected from the group consisting of stabilisers, acid scavengers, nucleating agents and mixtures thereof, also the biaxially oriented polypropylene (BOPP) film of the inventive use preferably comprises from 400 to 5000 ppm, based on the amount of the homopolymer of propylene, of additives selected from the group consisting of stabilisers, acid scavengers, nucleating agents and mixtures thereof.

In the following the invention will be described in more detail.

DETAILED DESCRIPTION

Homopolymer of Propylene

The homopolymer of propylene is produced by polymerising propylene in the presence of a polymerisation catalyst. The polymerisation catalyst typically comprises a solid component comprising a titanium halide, such as titanium trichloride, which in combination with an aluminium alkyl forms the catalyst. The homopolymer of propylene is thus produced by contacting propylene, the polymerisation catalyst and a chain transfer agent, such as hydrogen, optionally in an inert diluent, at a temperature of from 60 to 90° C. and a pressure of from 5 to 100 bar.

The expression "homopolymer of propylene" used in the instant invention relates to a polypropylene that consists substantially, i.e. of at least 99.5 wt.-%, based on the total weight of the polypropylene, preferably of at least 99.6 wt.-%, more preferably of at least 99.8 wt.-%, of propylene units. In one embodiment of the present invention, only propylene units in the homopolymer of propylene are detectable.

The homopolymer of propylene has a high crystallinity. Therefore, it is one requirement of the present invention that the homopolymer of propylene has a content of isotactic pentad fraction (mmmm) of from 95 to 98%, preferably from 95.5 to 98% and in particular from 96 to 97.5%. Unless otherwise indicated, the content of isotactic pentad fraction (mmmm) is determined by $^{13}$C-NMR-spectroscopy. If the content of isotactic pentads (mmmm) is less than 95%, the final crystallinity of the film is rather low and the tensile properties and moduli of the film decrease, especially on BOPP films produced on double bubble technologies. On the other hand, if the content of isotactic pentads is more than 98%, there are frequent film breaks during film orientation in machine direction, on one hand, and more specifically in cross direction in the tenter oven, on the other hand, or too many bubble bursts in the double bubble film technology. The content of isotactic pentad fraction is typically determined by the polymerisation catalyst used for producing the propylene homopolymer. Suitable catalysts are, for instance, those disclosed in U.S. Pat. No. 4,534,953 and EP-A-99026. Furthermore, it is known to influence the fraction of isotactic material by using suitable donors, either internal or external electron donors. The internal donors are a part of the solid catalyst component. Examples of suitable internal donors include ethers, ketones, esters and their combinations. The external donors are typically contacted with the aluminium alkyl, the two of which combined form a cocatalyst. Suitable external donors include ethers, esters, silicon ethers, amines and their combinations.

Preferably, the homopolymer of propylene is a crystalline polypropylene. The term "crystalline" indicates that the homopolymer of propylene has a rather high melting temperature. Accordingly, throughout the invention the homopolymer of propylene is regarded as crystalline unless otherwise indicated.

Therefore, the homopolymer of propylene has preferably a ($T_m$) as measured by differential scanning calorimetry (DSC) of at least 160° C., i.e. in the range of from 160 to 170° C., more preferably of at least 162° C., i.e. in the range of from 162 to 170° C., more preferably in the range of from 162 to 169° C. or in the range of from 162 to 168° C.

In one embodiment of the present invention, the homopolymer of propylene has a rather high crystallization temperature ($T_c$) as measured by differential scanning calorimetry (DSC). Thus in this embodiment, the polypropylene (PP) has a crystallization temperature ($T_c$) measured by differential scanning calorimetry (DSC) of at least 115° C., preferably of at least 118° C., and more preferably of at least 120° C. Accordingly, the homopolymer of propylene has a crystallization temperature ($T_c$) measured by differential scanning calorimetry (DSC) in the range of from 108 to 120° C., preferably in the range of from 110 to 118° C., and more preferably in the range of from 110 to 115° C.

Additionally or alternatively, the homopolymer of propylene has a relatively high polydispersity index. In one embodiment of the present invention, the homopolymer of propylene has a polydispersity index of ≥5.0, preferably of from 5.0 to 9.0, more preferably from 5.0 to 8.0 and most preferably from 5.0 to 7.0.

Preferably, the homopolymer of propylene has low amount of regio defects. Accordingly it is preferred that the homopolymer of propylene has 2,1 erythro regio-defects of below 1.0 mole-%, preferably below 0.5 mole-%, more preferably below 0.3 mole-% determined by $^{13}$C-NMR spectroscopy. In one specific embodiments no 2,1-erythro regio-defects are detectable.

The instant homopolymer of propylene preferably features a low amount of xylene cold solubles (XCS), i.e. of ≤4.0 wt.-%, preferably in the range from 1.0 to 4.0 wt.-%, more preferably in the range from 1.5 to 3.5 wt.-% and most preferably in the range from 2.0 to 3.5 wt.-%.

Additionally or alternatively, the homopolymer of propylene has a melt flow rate $MFR_2$ (230° C.) measured according to ISO 1133 of ≤7.0 g/10 min, and preferably of ≤5.0 g/10 min. For example, the homopolymer of propylene has a melt flow rate $MFR_2$ (230° C.) measured according to ISO 1133 in the range of 0.5 to 7.0 g/10 min, preferably in the range of 1.0 to 5.0 g/10 min, more preferably in the range of 1.5 to 5.0 g/10 min, and yet more preferably in the range of 1.5 to 4.0 g/10 min.

It is preferred that the homopolymer of propylene has a broad molecular weight distribution. It is thus one further requirement of the present invention that the homopolymer of propylene has a ratio of weight average molecular weight ($M_w$) to number average molecular weight ($M_n$) [$M_w/M_n$] of at least 9.0. In one embodiment, the homopolymer of propylene has a ratio of weight average molecular weight ($M_w$) to number average molecular weight ($M_n$) [$M_w/M_n$] of at least 10.0, preferably from 10.0 to 15.0. Preferably, the homopolymer of propylene has a ratio of weight average molecular weight ($M_w$) to number average molecular weight ($M_n$) [$M_w/M_n$] from 10.0 to 14.0 or from 10.0 to 13.0.

Furthermore, it is required that the homopolymer of propylene has ash content of not more than 30 ppm, preferably not more than 20 ppm and in particular not more than 15 ppm, based on the total weight of the homopolymer of propylene. The low ash content is necessary because metallic impurities in the film may cause reduction in the breakdown voltage.

Typically, the low ash content may be obtained by using a catalyst which has a sufficiently high activity such that the catalyst residues remain at a low level. Alternatively still, the polymer may be subjected to one or more washing steps where the catalyst residues are dissolved and removed from the polymer. Suitable catalysts which can be used for producing the homopolymer of propylene include catalysts based on a solid component comprising titanium trichloride, optionally containing an ether or an ester as an internal donor; catalysts based on a solid component comprising titanium tetrachloride supported on magnesium dichloride containing an ether or an ester as an internal donor; catalysts based on a solid component comprising titanium tetrachloride which are prepared by solidifying an emulsion comprising droplets of titanium tetrachloride and magnesium dichloride and which solid component comprises an ether or an ester as an internal donor; and catalysts based on a solid component comprising titanium tetrachloride which are prepared by precipitating titanium tetrachloride and magnesium dichloride simultaneously from a solution and which solid component comprises an ether or an ester as an internal donor. Such solid components are used with an aluminium alkyl compound, such as triethylaluminium or diethylaluminiumchloride, or mixtures of aluminium alkyl compounds, optionally in combination with an external donor. It is especially preferred that the solid component comprises an electron donor. When using such catalysts the homopolymer of propylene has been found to be within the specified limits.

Thus, it is preferred that the homopolymer of propylene comprises a residual amount of catalyst components, more preferably of titanium, aluminium and/or chloride, in sum of not more than 15 ppm, preferably not more than 12 ppm and in particular not more than 10 ppm, based on the total weight of the homopolymer of propylene. The residual amount of catalyst components such as titanium and aluminium can be determined by ICP, while the residual amount of catalyst components such as chloride can be determined by XRF.

A process which is particularly effective in producing homopolymer of propylene which are suitable for making the films of the present invention is disclosed in EP-A-2543684 where a catalyst based on a solid component comprising titanium trichloride was used in combination with an aluminium alkyl, organic ether and an alkyl methacrylate.

The polymerisation is conveniently conducted in slurry. In such a process the catalyst, hydrogen and propylene monomer are contacted in a diluent comprising essentially one or more alkanes having from 4 to 15 carbon atoms, preferably from 10 to 14 carbon atoms. By "comprising essentially" is hereby meant that the diluent comprises at least 90%, preferably at least 95% and more preferably at least 99% by weight of one or more of such alkanes.

The polymerisation is typically conducted at a temperature of from 50 to 100° C., preferably at 60 to 80° C. and a pressure of from 1 to 50 bar, preferably from 3 to 15 bar.

Preferably the process comprises one or more washing steps. Washing is typically conducted by contacting polymer slurry with a hydrocarbon diluent in one or more steps. Preferably the polymer slurry is contacted with the hydrocarbon diluent in at least two steps. When the washing includes multiple steps it is then preferred that in at least one step an alcohol or an ether is present in addition to the hydrocarbon diluent. This facilitates the removal of the catalyst components from the polymer and thereby a polymer with a very low ash content can be obtained.

Additives

The biaxially oriented polypropylene (BOPP) film comprises one or more additives selected from the group consisting of stabilisers, acid scavengers, nucleating agents and mixtures thereof. Preferably, the one or more additives used in the present invention are selected from the group consisting of nucleating agents, antioxidants, acid scavengers and stabilisers. In one embodiment, the biaxially oriented polypropylene (BOPP) film comprises stabilisers as the one or more additives.

It is appreciated that the expression "one or more" additives means that one or more kinds of additives may be present in the biaxially oriented polypropylene (BOPP) film.

Accordingly, it should be noted that the one or more additives may be one kind of additive. Alternatively, the one or more additives may be a mixture of two or more kinds of additives. For example, the one or more additives may be a mixture of two or three kinds of additives, like two kinds of additives.

Preferably, the one or more additives is one kind of additive, e.g. stabilizers

The homopolymer of propylene according to the present invention has a higher isotacticity than conventionally used homopolymers of propylene. Thus, it has been customary to use polypropylenes having an isotacticity of from 90 to 94% in the oil-impregnated films. However, it has been found that when homopolymers of propylene having an isotacticity of from 95 to 98% are used in the application of oil-impregnated films the polymer is more prone to degradation than the conventional homopolymer of propylene having an isotacticity of from 90 to 94%. Therefore, more effective stabilisation is required for the polymer.

Thus, the biaxially oriented polypropylene (BOPP) film preferably comprises stabilizers as the one or more additives. Preferably, the biaxially oriented polypropylene (BOPP) film preferably comprises stabilizer as the sole additive.

If the biaxially oriented polypropylene (BOPP) film comprises stabilizers, it is appreciated that the biaxially oriented polypropylene (BOPP) film may comprise one stabilizer or a mixture of stabilizers. For example, if the biaxially oriented polypropylene (BOPP) film comprises a mixture of stabilizers, the mixture comprises two or three stabilizers, like two stabilizers.

Another problem is that some stabilisers tend to dissolve into the oil phase and thus migrate from the polymer into the oil phase. This deteriorates the oil, on one hand, and leaves the polymer without sufficient stabilisation, on the other hand. Thus, it is preferred to have a stabiliser or a mixture of stabilisers which does not have the draw-backs discussed above and which does not adversely influence the electrical properties of the film.

It is appreciated that the biaxially oriented polypropylene (BOPP) film comprises the one or more additives preferably in an amount from 400 to 5000 ppm, more preferably from 400 to 3000 ppm, and most preferably from 400 to 1800 ppm, based on the total weight of the homopolymer of propylene.

The stabilisers used in the present invention are preferably selected from the group consisting of 1,3,5-trimethyl-2,4,6-tris(3,5-di-tert-butyl-4-hydroxybenzyl)benzene and butylhydroxytoluene.

In one embodiment, the stabiliser is 1,3,5-trimethyl-2,4, 6-tris(3,5-di-tert-butyl-4-hydroxybenzyl)benzene. Alternatively, the stabiliser is a mixture of 1,3,5-trimethyl-2,4,6-tris (3,5-di-tert-butyl-4-hydroxybenzyl)benzene and butylhydroxytoluene.

1,3,5-Trimethyl-2,4,6-tris(3,5-di-tert-butyl-4-hydroxybenzyl)benzene is preferably present in an amount of from 400 to 2000 ppm, based on the total weight of the homopolymer of propylene. More preferably, 1,3,5-trimethyl-2,4,6-tris(3,5-di-tert-butyl-4-hydroxybenzyl)benzene is present in an amount of from 400 to 1700 ppm, even more preferably from 400 to 1500 ppm, still more preferably from 400 to 1000 ppm and most preferably from 600 to 1000 ppm, based on the weight of the homopolymer of propylene. 1,3,5-Trimethyl-2,4,6-tris(3,5-di-tert-butyl-4-hydroxybenzyl)benzene is available under trade names of Irganox 1330, Anox 330, Ethanox 330, and Kinox 30.

If present, butylhydroxytoluene (BHT) is preferably present in an amount of from 100 to 1000 ppm, based on the weight of the homopolymer of propylene. More preferably, butylhydroxytoluene (BHT) is present in an amount of from 100 to 800 ppm, even more preferably from 200 to 900 ppm and most preferably from 300 to 800 ppm, based on the total weight of the homopolymer of propylene. Butylhydroxytoluene is available under trade names of Ionol CP and Vulkanox BHT.

It has been found that in the present invention BHT acts as a process stabiliser. It prevents the polymer from degrading during the extrusion. Thereby the MFR of the polymer measured from the film is not substantially greater than the MFR of the polymer measured from the pellets.

In particular, the stabilisers (or antioxidants) do not preferably contain phosphorous containing secondary antioxidants, such as tris(2,4-ditert-butylphenyl)phosphite, because such compounds increase the dissipation in the final capacitor. Furthermore, the stabilisers (or antioxidants) do not preferably contain pentaerythritol tetrakis(3-(3,5-di-tert-butyl-4-hydroxyphenyl)propionate) as this compound tends to migrate from the film to the oil. This leads to deterioration of the oil.

If the stabiliser is a mixture of 1,3,5-trimethyl-2,4,6-tris (3,5-di-tert-butyl-4-hydroxybenzyl)benzene and butylhydroxytoluene, the weight ratio of 1,3,5-trimethyl-2,4,6-tris (3,5-di-tert-butyl-4-hydroxybenzyl)benzene to butylhydroxytoluene used for preparation is preferably ≥1.4, more preferably from 1.4 to 2.4 and most preferably from 1.5 to 2.2.

Nucleating agents are typically selected from the group consisting of salts of monocarboxylic acids and polycarboxylic acids, such as sodium benzoate; sorbitol compounds, such as diacetals of sorbitol or xylitol; nonitol based nucleating agents; phosphorous-based compounds, such as mono-, bis- or tetra-phenyl phosphates; hindered phenyl amines, such as hindered phenyl propionamides; talc; polymeric nucleating agents, such as homopolymers of vinylcyclohexane and 4-methyl-1-butene; and mixtures of two or more of the abovementioned compounds. Acid scavengers are typically salts of organic acids, such as stearates. They have the function of neutralising acids in polymer. Examples of such compounds are calcium stearate, zinc stearate and zinc oxide.

Other Components

The film may contain other polymeric components preferably in an amount of not more than 10% by weight, more preferably not more than 5% by weight. Such other polymeric components may be further homo- or copolymers of propylene, homo- or copolymers of ethylene and the like. If additional polymeric components are present, they preferably are other homo- or copolymers of propylene, more preferably homopolymers of propylene. Such polymers may be, for instance, carrier polymers of additive masterbatches and the like.

Other suitable polymeric components are long-chain branched polypropylene, such as disclosed in EP-A-792894 and U.S. Pat. No. 6,077,907, polyvinylcyclohexane, poly-4-methyl-1-butene and the like. These polymers are typically present in an amount of not more than 5% by weight and more preferably in an amount of not more than 3% by weight.

BOPP Film

The biaxially oriented polypropylene (BOPP) film is produced from the homopolymer of propylene in any suitable method known in the art. For example, the biaxially oriented polypropylene (BOPP) film according to this invention can be prepared by the tenter method or double bubble method known in the art.

According to one suitable method the film is extruded through a flat die. The extrudate is cooled in a chill roll so that the film solidifies. Then the temperature is adjusted to 145-150° C. by passing the film over heated rollers. When the film has the desired temperature it is passed through one or more set of drawing rollers so that the stretch ratio at the end is from 4:1 to 6:1.

Thereafter the film is passed on to a series of annealing rollers where it is heated to such temperature that the film does not shrink in machine direction. The film is then passed to a chain containing clips which close on to the film. The film is heated to 160° C. after which the chain diverges to a ratio of 8:1 to 10:1 (final width: original width). Thereafter the film is annealed at 155° C. for reducing the shrinkage. Thereafter the edges are trimmed off and the film is slit and wound.

According to an alternative method the orientation line works by the so-called "double-bubble process", i.e. the polymers are extruded through a circular die and immediately quenched on an inner cooling mandrel thus forming a thick primary tube which is then re-heated up to a suitable temperature, such as 155 to 160° C., and blown to form the main bubble of thin film.

The non-contact simultaneous orientation is achieved due to inflation with air during the start-up phase. This air allows the transversal orientation while the machine direction orientation is taken simultaneously due to the speed difference between the stretching nip roll and the tower nip roll.

The bubble is cooled by air and then flattened; after the trimming of the edge, the two webs obtained are rolled up in two reels.

The thickness of the biaxially oriented polypropylene (BOPP) film can be up to 50.0 gm, however, typically the biaxially oriented polypropylene (BOPP) film has a thickness of not more than 40.0 µm, preferably not more than 30.0 µm, more preferably not more than 25.0 µm, yet more preferably in the range of 1 to 50.0 µm, like in the range of 2.5 to 25.0 µm.

It is appreciated that the biaxially oriented polypropylene (BOPP) film has at least one layer comprising the homopolymer of propylene. Thus, the biaxially oriented polypropylene (BOPP) film can be a mono or multi-layer biaxially oriented polypropylene (BOPP) film. Preferably, the biaxially oriented polypropylene (BOPP) film is a mono-layer biaxially oriented polypropylene (BOPP) film.

A "monolayer" film refers to a film consisting of one layer only. A "multi-layer" film refers to a film consisting of two or more layers such as two to twenty layers, preferably three layers, which are adjacent to each other.

In case the biaxially oriented polypropylene (BOPP) film is a multi-layer biaxially oriented polypropylene (BOPP) film, the film can be prepared by co-extrusion or by laminating the layers before or after stretching. In one embodiment, a barrier layer is introduced between the layers of the multi-layer biaxially oriented polypropylene (BOPP) film. For example, the multi-layer biaxially oriented polypropylene film comprises an aluminium layer, which is located between two adjacent layers.

Structure

The structure of the present invention comprises the biaxially oriented polypropylene (BOPP) film having at least one layer comprising a homopolymer of propylene which layer is in contact with an oil phase, the homopolymer of propylene has
  a) a content of isotactic pentads in the range from 95% to 98%, and
  b) a content of ash of not more than 30 ppm, based on the total weight of the homopolymer of propylene,
characterized in that the oil phase has an absorbance value of ≤0.1, relative to the pure oil, as determined spectrophotometrically at a wavelength of 860 nm by the reduction of transmitted light intensity.

In one embodiment, the oil phase has an absorbance value of from 0.01 to 0.1, relative to the pure oil, as determined spectrophotometrically at a wavelength of 860 nm by the reduction of transmitted light intensity. Preferably, the oil phase has an absorbance value of from 0.01 to 0.8, more preferably from 0.01 to 0.6 and most preferably from 0.2 to 0.6, relative to the pure oil, as determined spectrophotometrically at a wavelength of 860 nm by the reduction of transmitted light intensity.

The absorbance values are given relative to a blank sample of the oil, i.e. the pure oil, which was measured first, and whose transmission was set to 100%, i.e. the effective absorbance of the oil was zero.

Unless otherwise indicated, the absorbance value is determined at room temperature after oil extraction at 80° C. for 24 hours.

It is appreciated that the present homopolymer of propylene provides an increased life time when used for the preparation of capacitors. This is due to the fact that the deposit formation, expressed by an absorbance value, inside the capacitor via the oil phase is dramatically reduced compared to a capacitor made from a biaxially oriented film which is free of a homopolymer of propylene having a content of isotactic pentads in the range from 95% to 98%, and a content of ash of not more than 30 ppm.

Thus, the absorbance value, determined spectrophotometrically at a wavelength of 860 nm, of the oil phase of the biaxially oriented film is preferably at least 50% below the absorbance value of the oil phase of a biaxially oriented film which is free of a homopolymer of propylene having a content of isotactic pentads in the range from 95% to 98%, and a content of ash of not more than 30 ppm. Preferably, the absorbance value, determined spectrophotometrically at a wavelength of 860 nm, of the oil phase of the biaxially oriented film is preferably at least 50 to 98% below the absorbance value of the oil phase of a biaxially oriented film which is free of a homopolymer of propylene having a content of isotactic pentads in the range from 95% to 98%, and a content of ash of not more than 30 ppm.

It is appreciated that the deposits forming the absorbance essentially consist of polypropylene components, i.e. of polymeric components. For example, the deposits forming the absorbance comprise polypropylene fractions which are extractable by the oil, such as atactic polypropylene fractions. That is to say, the deposits forming the absorbance are essentially free of additives, such as stabilizers.

According to one embodiment, the structure is a capacitor.

A capacitor usually has a structure as a belt-bundled assembly of several to several tens of unit capacitor elements each in the form of a flattened rolled body prepared by enrolling a dual layer consisting of a biaxially oriented polypropylene (BOPP) film and an aluminium foil. Such a belt-bundled assembly of unit capacitors is impregnated with oil in a metal casing before hermetically sealed such that at least one layer comprising a homopolymer of propylene is in contact with an oil phase.

Suitable oils used in the structure include mineral oils, synthetic hydrocarbon oils, vegetable oils and silicon oils.

One group of oils are those which contain aromatic hydrocarbons, preferably cyclic aromatic hydrocarbons, such as derivatives of toluene, particularly benzyltoluene and/or dibenzyltoluene, in an amount of at least 20% by weight, preferably at least 50% by weight. Such oils are generally used in capacitors due to their outstanding thermal aging resistance. They are available, among others, under a trade name of Jarylec™ from Arkema.

It is preferred that the oil consists of aromatic hydrocarbons.

The structures according to the present invention are suitable to be used in, for instance, high voltage power factor correction.

The capacitors including the structure according to the present invention have an increased life time. Furthermore, the capacitors including the structure according to the present invention have good heat-resistance and they have good electrical properties. Especially, their dielectric properties are maintained for a long period of time. Further, the capacitors can be used up to the temperatures of about 105° C.

In view of the very good results obtained, the present invention refers in another aspect to the use of a biaxially oriented polypropylene (BOPP) film for making capacitors comprising the structure as defined above, wherein the oil phase has an absorbance value of ≤0.1, relative to the pure oil, as determined spectrophotometrically at a wavelength of 860 nm by the reduction of transmitted light intensity.

It is appreciated that the capacitor is preferably prepared by the steps of flat winding the film and an aluminium foil to obtain a wound structure and impregnating the wound structure with an oil phase.

With regard to the definition of the biaxially oriented polypropylene (BOPP) film, the structure and preferred embodiments thereof, reference is made to the statements provided above when discussing the technical details of the structure of the present invention.

One specific advantage of the present invention is that the structure according to the present invention has an increased life time. Thus, in a further aspect the present invention refers to the use of a homopolymer of propylene having
 a) a content of isotactic pentads in the range from 95% to 98%, and
 b) a content of ash of not more than 30 ppm, based on the total weight of the homopolymer of propylene,
in a structure as defined above for increasing the life time of a capacitor. The increased life time is achieved if the oil phase has an absorbance value of ≤0.1, relative to the pure oil, as determined spectrophotometrically at a wavelength of 860 nm by the reduction of transmitted light intensity.

Another aspect refers to the use of a homopolymer of propylene having
 a) a content of isotactic pentads in the range from 95% to 98%, and
 b) a content of ash of not more than 30 ppm, based on the total weight of the homopolymer of propylene,
in a structure as defined above for reducing the amount of deposits in the oil phase of a capacitor. The reduction of deposits is achieved if the oil phase has an absorbance value of ≤0.1, relative to the pure oil, as determined spectrophotometrically at a wavelength of 860 nm by the reduction of transmitted light intensity.

With regard to the definition of the homopolymer of propylene, the structure and preferred embodiments thereof, reference is made to the statements provided above when discussing the technical details of the structure of the present invention.

BRIEF DESCRIPTION OF THE FIGURES

FIG. 1 shows the visual absorbance results of extraction experiments.

In the following the present invention is further illustrated by means of examples.

EXAMPLES

Description of Methods

Quantification of Microstructure by NMR Spectroscopy

Quantitative nuclear-magnetic resonance (NMR) spectroscopy was used to quantify the isotacticity and regio-regularity of the propylene homopolymers.

Quantitative $^{13}C\{^{1}H\}$ NMR spectra were recorded in the solution-state using a Bruker Advance III 400 NMR spectrometer operating at 400.15 and 100.62 MHz for $^{1}H$ and $^{13}C$ respectively. All spectra were recorded using a $^{13}C$ optimised 10 mm extended temperature probehead at 125° C. using nitrogen gas for all pneumatics.

For propylene homopolymers approximately 200 mg of material was dissolved in 1,2-tetrachloroethane-d2 (TCE-d2). To ensure a homogenous solution, after initial sample preparation in a heat block, the NMR tube was further heated in a rotary oven for at least 1 hour. Upon insertion into the magnet the tube was spun at 10 Hz. This setup was chosen primarily for the high resolution needed for tacticity distribution quantification (Busico, V., Cipullo, R., Prog. Polym. Sci. 26 (2001) 443; Busico, V.; Cipullo, R., Monaco, G., Vacatello, M., Segre, A. L., Macromolecules 30 (1997) 6251). Standard single-pulse excitation was employed utilising the NOE and bi-level WALTZ16 decoupling scheme (Zhou, Z., Kuemmerle, R., Qiu, X., Redwine, D., Cong, R., Taha, A., Baugh, D. Winniford, 15 B., J. Mag. Reson. 187 (2007) 225; Busico, V., Carbonniere, P., Cipullo, R., Pellecchia, R., Severn, J., Talarico, G., Macromol. Rapid Commun. 2007, 28, 11289). A total of 8192 (8k) transients were acquired per spectra.

Quantitative $^{13}C\{^{1}H\}$ NMR spectra were processed, integrated and relevant quantitative properties determined from the integrals using proprietary computer programs.

For propylene homopolymers all chemical shifts are internally referenced to the methyl isotactic pentad (mmmm) at 21.85 ppm.

Characteristic signals corresponding to regio defects (Resconi, L., Cavallo, L., Fait, A., Piemontesi, F., Chem. Rev. 2000, 100, 1253; Wang, W-J., Zhu, S., Macromolecules 33 (2000), 1157; Cheng, H. N., Macromolecules 17 (1984), 1950) or comonomer were observed.

The tacticity distribution was quantified through integration of the methyl region between 23.6-19.7 ppm correcting for any sites not related to the stereo sequences of interest (Busico, V., Cipullo, R., Prog. Polym. Sci. 26 (2001) 443; Busico, V., Cipullo, R., Monaco, G., Vacatello, M., Segre, A. L., Macromolecules 30 (1997) 6251).

By pentad isotacticity is meant the fraction of isotactic pentads (mmmm).

The isotacticity was determined at the pentad level and reported as the percentage of isotactic pentad (mmmm) sequences with respect to all pentad sequences:

$$[mmmm]\% = 100*(mmmm/\text{sum of all pentads})$$

The presence of 2,1 erythro regio defects was indicated by the presence of the two methyl sites at 17.7 and 17.2 ppm and confirmed by other characteristic sites.

Characteristic signals corresponding to other types of regio defects were not observed (Resconi, L., Cavallo, L., Fait, A., Piemontesi, F., Chem. Rev. 2000, 100, 1253).

The amount of 2,1 erythro regio defects was quantified using the average integral of the two characteristic methyl sites at 17.7 and 17.2 ppm:

$$P_{21e}=(I_{e6}+I_{e8})/2$$

The amount of 1,2 primary inserted propene was quantified based on the methyl region with correction undertaken for sites included in this region not related to primary insertion and for primary insertion sites excluded from this region:

$$P_{12}=I_{CH3}+P_{12e}$$

The total amount of propene was quantified as the sum of primary inserted propene and all other present regio defects:

$$P_{total}=P_{12}+P_{21e}$$

The mole percent of 2,1 erythro regio defects was quantified with respect to all propene:

$$[21e]\text{mol \%}=100*(P_{21e}/P_{total})$$

Rheology:

Dynamic rheological measurements were carried out with Rheometrics RDA-II QC on compression moulded samples under nitrogen atmosphere at 200° C. using 25 mm diameter plate and plate geometry. The oscillatory shear experiments were done within the linear viscoelastic range of strain at frequencies from 0.015 to 300 rad/s (ISO 6721-10).

The values of storage modulus (G'), loss modulus (G"), complex modulus (G*) and complex viscosity ($\eta^*$) were obtained as a function of frequency ($\omega$).

The Zero shear viscosity ($\eta_0$) was calculated using complex fluidity defined as the reciprocal of complex viscosity. Its real and imaginary part are thus defined by $$f'(\omega)=\eta'(\omega)/[\eta'(\omega)^2+\eta''(\omega)^2] \text{ and}$$

$$f''(\omega)=\eta''(\omega)/[\eta'(\omega)^2+\eta''(\omega)^2]$$

From the following equations $$\eta'=G''/\omega \text{ and } \eta''=G'/\omega$$

$$f'(\omega)=G''(\omega)\cdot\omega/[G'(\omega)^2+G''(\omega)^2]$$

$$f''(\omega)=G'(\omega)\cdot\omega/[G'(\omega)^2+G''(\omega)^2]$$

The complex viscosity ratio eta*(0.05 rad/sec)/eta*(300 rad/sec), also the shear thinning index is the ratio of the complex viscosity ($\eta^*$) at 0.05 rad/sec to the complex viscosity ($\eta^*$) at 300 rad/sec.

The Polydispersity Index, PI,

PI=$10^5/G_c$, is calculated from the cross-over point of G'($\square$) and G"($\omega$), for which G'($\omega_c$)=G"($\omega_c$)=$G_c$ holds.

Number Average Molecular Weight ($M_n$), Weight Average Molecular Weight ($M_w$)

Molecular weight averages Mw and Mn were determined by Gel Permeation Chromatography (GPC) according to ISO 16014-4:2003 and ASTM D 6474-99. A PolymerChar GPC instrument, equipped with infrared (IR) detector was used with 3× Olexis and 1× Olexis Guard columns from Polymer Laboratories and 1,2,4-trichlorobenzene (TCB, stabilized with 250 mg/L 2,6-Di tert butyl-4-methyl-phenol) as solvent at 160° C. and at a constant flow rate of 1 mL/min. 200 µL of sample solution were injected per analysis. The column set was calibrated using universal calibration (according to ISO 16014-2:2003) with at least 15 narrow MWD polystyrene (PS) standards in the range of 0.5 kg/mol to 11 500 kg/mol. Mark Houwink constants for PS, PE and PP used are as described per ASTM D 6474-99. All samples were prepared by dissolving 5.0-9.0 mg of polymer in 8 mL (at 160° C.) of stabilized TCB (same as mobile phase) for 2.5 hours for PP or 3 hours for PE at max. 160° C. under continuous gentle shaking in the autosampler of the GPC instrument.

Melt Flow Rate

Melt flow rate (MFR, $MFR_2$) was determined according to ISO 1133 at 230° C. under the load of 2.16 kg.

Melting Temperature and Crystallinity of the Film

Melting temperature was measured on about 5 to 7 mg film samples with a TA Instrument Q200 differential scanning calorimetry (DSC). DSC is run according to ISO 11357/part 3/method C2 in a heat/cool/heat cycle with a scan rate of 10° C./min in the temperature range of −30 to +225° C. The crystallinity is obtained by dividing the measured melting enthalpy (in J/g) by the melting enthalpy of 100% crystalline polypropylene, 209 J/g.

Ash Content

The ash content of the polymer was determined by combusting the polymer in a weighed platinum crucible. About 100 grams of polymer is weighed into the crucible. The crucible is then heated in a Bunsen burner flame so that the polymer slowly burns. After the polymer is completely burned the crucible is cooled, dried and weighed. The ash content is then the weight of the residue divided by the weight of the polymer sample. At least two measurements are made and if the difference between the measurements is more than 7 ppm then a third measurement is made.

Absorbance 1 g of each BOPP Film was extracted with 6 ml oil at 80° C. for 24 hours using small glass flasks. Subsequently, the residual film was removed and the flasks with the oil were rapidly cooled down to room temperature (21° C.±2° C.) by placing the glass flasks in a metal block kept at room temperature.

Then, within 4 hours after stopping the extraction experiment, the absorbance value of the oil phase was determined spectrophotometrically by measuring the reduction in light transmittance intensity at a wavelength of 860 nm in accordance with ISO 7027-1 by using the spectrophotometer Shimadzu UV1601 instrument.

The absorbance is expressed by the formula ABS=LOG ($I_0/I$), wherein $I_0$ relates to the intensity of the incident light at 860 nm and I relates to the intensity of the transmitted light. The absorbance values are given relative to a blank sample of the oil which was measured first, and whose transmission was set to 100%, i.e. the effective ABS of the oil was zero.

EXAMPLES

Inventive Example 1

The polymerisation process according to Inventive Example 1 of EP-A-2543684 was used for the polymerisation of propylene. Hydrogen and propylene were fed into the reactor so that in each of the polymerisation reactors a propylene homopolymer having $MFR_2$ of about 3.4 g/10 min was produced. Into the polymer was added Irganox 1330 in an amount of 1000 ppm and BHT in an amount of 500 ppm. The propylene homopolymer had a polydispersity index of 5.5 Pa$^{-1}$, a shear thinning index of 14, ash content of 8 ppm and a pentad isotacticity of 96.2%.

The propylene homopolymer as described above was processed to a film by a double bubble process, the resulting film had a thickness of 11 μm. The film had a melting temperature of 167° C. and crystallinity of 66.4%.

Inventive Example 2

The propylene homopolymer as described for inventive example 1 was processed to a film by a tenter process, the resulting film had a thickness of 11 μm. The film had a melting temperature of 167° C. and crystallinity of 71.4%.

Comparative Example 1

The procedure of Example 1 was otherwise followed except that the polymerisation process was conducted according to Comparative Example 1 of EP-A-2543684 and that instead of Irganox 1330, Irganox 1010 in an amount of 4500 ppm and BHT in and BHT in an amount of 1000 ppm was used. The propylene homopolymer had a polydispersity index of 4.5 Pa$^{-1}$, a shear thinning index of 10, ash content of 9 ppm and a pentad isotacticity of 92.2%.

The propylene homopolymer as described above was processed to a film by a tenter process, the resulting film had a thickness of 11 μm. The film had a melting temperature of 166° C. and crystallinity of 70.0%.

Comparative Example 2

The procedure of Example 1 was otherwise followed except that the polymerisation process was conducted according to Comparative Example 1 of EP-A-2543684 and that Irganox 1330 in an amount of 1000 ppm was used and BHT was not used. The propylene homopolymer had a polydispersity index of 4.5 Pa$^{-1}$, a shear thinning index of 10, ash content of 9 ppm and a pentad isotacticity of 92.2%.

The propylene homopolymer as described above was processed to a film by a tenter process, the resulting film had a thickness of 11 μm. The film had a melting temperature of 166° C. and crystallinity of 68.5%.

Comparative Example 3

The propylene homopolymer as described for comparative example 2 was processed to a film by a double bubble process, the resulting film had a thickness of 11 μm. The film had a melting temperature of 166° C. and crystallinity of 67.1%.

Test 1

Three different extraction experiments were performed with the five comparative and inventive BOPP films using Jarylec C101 ("oil" in the remainder).

Extraction 1 (HPLC):
1 g of each BOPP film was extracted with 200 ml oil at 80° C. for 24 h and then the oil was allowed to cool to room temperature. The oil was filtrated, diluted by a factor 10:1 and analysed by HPLC to determine the additive content in the oil.

Extraction 2:
1 g of each BOPP Film was extracted with 6 ml oil at 80° C. for 18 hours and then the oil was allowed to cool to room temperature. The absorbance of the oil was qualitatively assessed by visual impression as documented by the photographs in FIG. 1.

Extraction 3:
1 g of each BOPP Film was extracted with 6 ml oil at 80° C. for 24 hours. Subsequently, the samples very rapidly cooled down to room temperature (21° C.±2° C.) by placing the sample flasks in a metal block held at room temperature. Then, the absorbance of the oil phase was determined spectrophotometrically at a wavelength of 860 nm.

The results of the extraction experiments are shown in Table 1 and FIG. 1.

TABLE 1

Results of extraction experiments

| | Oil phase | | | |
|---|---|---|---|---|
| | Extraction 1 | | | |
| BOPP Film | Stabilizers (Irganox1010/1330) ppm | BHT ppm | Extraction 2 Absorbance visible | Extraction 3 Absorbance value |
| CE1 | Traces | – | + | 0.13 |
| CE2 | Traces | – | +++ | 0.82 |
| CE3 | Traces | – | ++ | 0.39 |
| IE1 | Traces | Traces | – | 0.05 |
| IE2 | Traces | – | – | 0.04 |
| Pure Oil | No | No | – | 0.00 |

From the HPLC analyses, it can be gathered that only traces of the additives (Irganox1010/1330 and BHT if present) were found in the oil.

From the visual experiments set out in FIG. 1, it can be gathered that the oil phases of CE2 and CE3 became opaque, while the oil phase of CE1 showed only slight absorbance. The absorbance was strongest for CE2. IE1 and 1E2 remained clear. The spectrophotometric determination of the absorbance revealed that comparative examples CE1, CE2 and CE3 had an absorbance of above 0.1, relative to the pure oil. In contrast, the inventive examples had an absorbance of clearly below 0.1, relative to the pure oil.

The invention claimed is:

1. A structure comprising a biaxially oriented polypropylene (BOPP) film having at least one layer comprising a homopolymer of propylene which layer is in contact with an oil phase, the homopolymer of propylene having:
   a) a content of isotactic pentads in the range from 95% to 98%, and
   b) a content of ash of not more than 30 ppm, based on the total weight of the homopolymer of propylene,
   wherein the oil phase has an absorbance value of ≤0.1, relative to the pure oil, as determined spectrophotometrically at a wavelength of 860 nm by the reduction of transmitted light intensity,
   wherein the BOPP film comprises additives selected from the group consisting of stabilisers, acid scavengers, nucleating agents and mixtures thereof, wherein the stabilisers are selected from the group consisting of 1,3,5-trimethyl-2,4,6-tris(3,5-di-tert-butyl-4-hydroxybenzyl)benzene in an amount of from 400 to 2000 ppm and a combination of 1,3,5-trimethyl-2,4, 6-tri s(3,5-di-tert-butyl-4-hydroxybenzyl)benzene in an amount of from 400 to 2000 ppm and butylhydroxytoluene in an amount of from 100 to 1000 ppm, based on the total weight of the homopolymer of propylene.

2. The structure according to claim 1, wherein the BOPP biaxially oriented polypropylene (BOPP) film comprises from 400 to 5000 ppm, based on the total weight of the homopolymer of propylene, of the additives.

3. The structure according to claim 1, wherein the stabilisers consist of 1,3,5-trimethyl-2,4, 6-tri s(3,5-di-tert-butyl-4-hydroxybenzyl)benzene in an amount of from 400 to 1000 ppm and a combination of 1,3,5-trimethyl-2,4,6-tris(3,5-di-tert-butyl-4-hydroxybenzyl)benzene in an amount of from 400 to 1000 ppm and butylhydroxytoluene in an amount of from 100 to 800 ppm, based on the total weight of the homopolymer of propylene.

4. The structure according to claim 1, wherein the oil phase comprises at least 20% by weight of aromatic hydrocarbons.

5. The structure according to claim 4, wherein the oil phase comprises cyclic aromatic hydrocarbons.

6. The structure according to claim 5, wherein the oil phase comprises at least 50% by weight of cyclic aromatic hydrocarbons.

7. The structure according to claim 1, wherein the absorbance consists essentially of polypropylene components.

8. The structure according to claim 1, wherein the oil phase has an absorbance value of from 0.01 to 0.1, relative to the pure oil, as determined spectrophotometrically at a wavelength of 860 nm by the reduction of transmitted light intensity.

9. The structure according to claim 1, wherein the absorbance value, determined spectrophotometrically at a wavelength of 860 nm, of the oil phase of the BOPP film is at least 50% below the absorbance value of the oil phase of a BOPP film which is free of a homopolymer of propylene having a content of isotactic pentads in the range from 95% to 98%, and a content of ash of not more than 30 ppm.

10. The structure according to claim 1, wherein the structure is a capacitor.

11. The structure according to claim 1, wherein the oil phase comprises toluene derivatives.

12. A method of forming a capacitor, the method comprising forming the structure as defined in claim 1, wherein the oil phase has an absorbance value of ≤0.1, relative to the pure oil, as determined spectrophotometrically at a wavelength of 860 nm by the reduction of transmitted light intensity.

13. The method according to claim 12, wherein forming the capacitor comprises the steps of flat winding the BOPP film and an aluminium foil to obtain a wound structure and impregnating the wound structure with an oil phase.

14. Use of a homopolymer of propylene having:
a) a content of isotactic pentads in the range from 95% to 98%, and
b) a content of ash of not more than 30 ppm, based on the total weight of the homopolymer of propylene,
in a structure as defined in claim 1 for increasing the life time of a capacitor, characterized in that the increased life time is achieved if the oil phase has an absorbance value of ≤0.1, relative to the pure oil, as determined spectrophotometrically at a wavelength of 860 nm by the reduction of transmitted light intensity.

* * * * *